United States Patent

[15] 3,699,751

Ross et al.

[45] Oct. 24, 1972

[54] WINDROWER DRIVE MEANS

[72] Inventors: Brian Francis Ross, St. Catharines, Ontario; Dalton Harold Spicer, Welland, Ontario, both of Canada

[73] Assignee: Deere & Company, Moline, Ill.

[22] Filed: July 13, 1970

[21] Appl. No.: 54,320

[52] U.S. Cl. ............56/10.3, 56/11.6, 56/14.4, 56/14.5, 56/186, 56/192, 56/220, 56/224, 74/242.9, 192/150
[51] Int. Cl. .............................A01d 43/00
[58] Field of Search.....56/10.3, 14.4, 14.5, 158, 181, 56/186–188, 192, 220–222, 224, 225, 11.6; 198/36; 280/462; 74/242.9, 242.15; 192/56, 150

[56] References Cited

UNITED STATES PATENTS

| | | | |
|---|---|---|---|
| 2,725,706 | 12/1955 | Ashton et al. | 56/192 |
| 3,021,659 | 2/1962 | Newhouse et al. | 56/192 |
| 2,700,859 | 2/1955 | Vigum et al. | 56/192 X |
| 2,913,977 | 11/1959 | Claas et al. | 192/150 X |
| 2,615,344 | 10/1952 | Thomson | 56/10.3 X |
| 2,377,331 | 6/1945 | Dray | 56/10.3 |
| 1,948,927 | 2/1934 | Lindgren et al. | 56/192 UX |

Primary Examiner—Louis G. Mancene
Assistant Examiner—J. A. Oliff
Attorney—H. Vincent Harsha, Harold M. Knoth, William A. Murray, John M. Nolan and Raymond L. Hollister

[57] ABSTRACT

A drive system for the power-operated components of a pull-type windrower, including a fore- and-aft shaft on the windrower draft frame adapted to be driven by the draft vehicle, a first transverse countershaft on the windrower main frame adjacent to and drivingly connected with the fore- and-aft shaft, and a second transverse countershaft on the main frame above and spanning the swath opening in the central portion of the frame and drivingly connected with the first transverse countershaft. A reciprocating cutter bar on the leading edge of the windrower grain platform and a transverse reel mounted above and forwardly of the cutter bar are driven from the first countershaft, the reel drive including a spring overload release mechanism, and a pair of platform canvases on opposite sides of the swath opening are driven from the second countershaft.

12 Claims, 6 Drawing Figures

PATENTED OCT 24 1972 3,699,751

INVENTORS
BRIAN F. ROSS
DALTON H. SPICER

INVENTORS
BRIAN F. ROSS
DALTON H. SPICER

INVENTORS
BRIAN F. ROSS
DALTON H. SPICER

WINDROWER DRIVE MEANS

BACKGROUND OF THE INVENTION

The present invention relates generally to windrowers, and more particularly to means for driving the power-operated components of a pull-type windrower from a power take-off shaft on the draft vehicle.

A pull-type windrower is conventionally provided with a number of power-operated components, including a reciprocating cutter bar, a rotatable harvester reel, and at least one platform canvas or endless conveyor, these components being conventionally driven from the power take-off shaft on the tractor used to pull the implement. Various drive arrangements have previously been used to transmit power from the power take-off shaft to these components, among which are those disclosed in U.S. Pat. Nos. 2,725,706 to Ashton et al.; 2,924,466 to Johnson; 3,021,659 to Newhouse et al.; and 3,214,002 to Kirkpatrick et al.

SUMMARY OF THE INVENTION

The primary object of the present invention is the provision of a drive mechanism for the operating components of a windrower characterized by its extreme simplicity, economy of manufacture, and reliability. It is a further object to provide an automatic overload release mechanism in the windrower reel drive, to protect the reel and its associated components from damage should it become jammed by a foreign object.

These and other objects are achieved, according to the invention, by the provision of a fore- and-aft shaft on the draft frame of the windrower, the shaft being adapted at its forward end for connection with the power take-off shaft of the draft vehicle, a first countershaft on the transverse main frame section of the windrower adjacent one end of the grain platform and connected to the fore- and-aft shaft through a 90° belt drive, and a second countershaft on the main frame above and spanning the U-shaped swath opening in the center portion of the frame, the second countershaft being driven from the first through a third shaft universally coupled at opposite ends to the first and second shafts. A crank on the first countershaft drives a cutter bar on the transverse leading edge of the grain platform through a pitman and bell crank mechanism, and a variable speed sheave on the same countershaft drives a harvester reel supported on a pair of forwardly extending arms above and forwardly of the cutter bar, the reel operating conventionally to feed standing grain into the cutter bar. The second countershaft is provided with a sheave on each end positioned directly above and coupled with a pair of sheaves driving the left and right platform canvas sections on the respective sides of the swath opening. The canvas sections are driven in opposite directions to transport cut grain from both sides of the platform centrally to the opening, through oppositely twisted belts connecting the countershaft and canvas drive sheaves.

Included in the harvester reel drive is a spring overload release mechanism which acts to prevent excess tension in the endless flexible element driving the reel. The mechanism consists of a pair of supports pivotally mounted at one end of the reel arms and rotatably mounting the opposite ends of the reel shaft on their other ends. A spring which biases each support against the arm is adapted to yield under excess load and thereby allow the supports to pivot rearwardly, thus relaxing the tension in the drive element and preventing damage to the reel.

The 90° belt drive connecting the fore- and-aft shaft on the draft frame with the first countershaft on the main frame section includes a pair of idler sheaves in transverse and fore- and-aft alignment, respectively, with a drive sheave on the rearward end of the fore- and-aft shaft and a driven sheave on the countershaft. The main frame section is rotatable relative to the draft frame to accommodate vertical adjustment of the platform, and the idler sheaves are mounted on a four-bar linkage between the two frame sections to maintain tension in the drive belt throughout the range of relative movement therebetween.

BRIEF DESCRIPTION OF THE DRAWINGS

The preferred embodiments of the invention will be described in conjunction with the accompanying drawings in which.

DESCRIPTION OF THE PREFERRED EMBODIMENT

In the ensuing description, right- and left-hand reference is determined by standing at the rear of the machine and facing the direction of travel.

Figure 1:
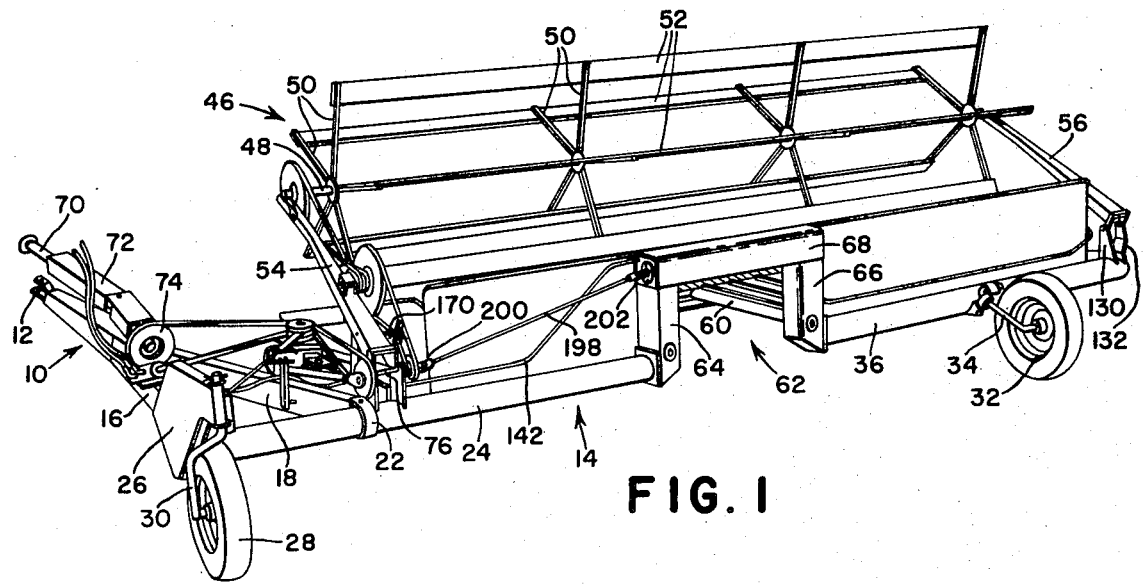
FIG. 1 is a left rear perspective view of a windrower incorporating the drive means of the present invention.

A windrower incorporating the principles of the present invention, illustrated in its entirety in FIG. 1, includes an L-shaped frame structure comprising a generally fore- and-aft draft frame section 10 having a clevis 12 at its forward end for connection to the drawbar of a conventional agricultural tractor, and a transversely elongated main frame section 14 connected at its left end to the draft frame 10. The frame section 10 includes a pair of left and right rearwardly diverging beams 16 and 18, respectively, having U-shaped bearing blocks 20 and cooperating U-shaped straps 22 on their rearward ends (only those on the beam 18 being shown) for rotatably receiving spaced portions of a left tubular member 24 of the main frame 14. Fixed to the extreme left end of the tubular member 24 is a vertical plate-like structure 26 supporting a ground-engaging wheel 28 on a carrying arm 30. An identical wheel 32 on a carrying arm 34 is supported on a right tubular member 36 of the main frame 14. Rigidly fixed to the frame 14 and extending forwardly therefrom is a grain platform, indicated generally at 38 and including a conventional reciprocating cutter bar assembly 40 extending along its leading edge. The height of the cutter bar 40 relative to the ground is controlled by the position of the main frame 14 relative to the draft frame 10. Rotation of the frame 14 is effected by an extensible and retractable hydraulic ram 42 acting between a bracket 44 on the beam 16 and the structure 26, and actuated by hydraulic fluid under pressure from the hydraulic system on the tractor. A reel 46, comprising a shaft 48, a plurality of aligned sets of spokes 50 extending radially from the shaft 48 at spaced intervals therealong, and a plurality of transverse slats 52 connecting the outer ends of the aligned spokes 50, is supported above and forwardly of the cutter bar 40 on a pair of arms 54 and 56 pivotally carried by the main frame 14. The platform 38 includes left and right canvases or endless conveyor means 58 and 60, respectively, which operate to transport cut grain from the respective sides of the platform to a common central discharge opening where it is deposited in a swath on the ground. A downwardly opening, U-shaped swath opening 62 is formed in the main frame 14 to allow the frame to clear the swath, the opening being defined by left and right vertical tubular members 64 and 66, respectively, rigidly fixed to the inner ends of the left and right tubular members 24 and 36, respectively, and up upper transverse tubular member 68 connecting the upper ends of the members 64 and 66.

In operation of the windrower, the standing grain is directed into the reciprocating cutter bar 40 by the slats 52 of the revolving reel 46, the stalks are severed and directed rearwardly onto one of the canvases 58 and 60. The canvases transport the cut grain from each side of the platform to the center thereof, where it is deposited in a swath on the stubble remaining on the ground.

Figure 2:
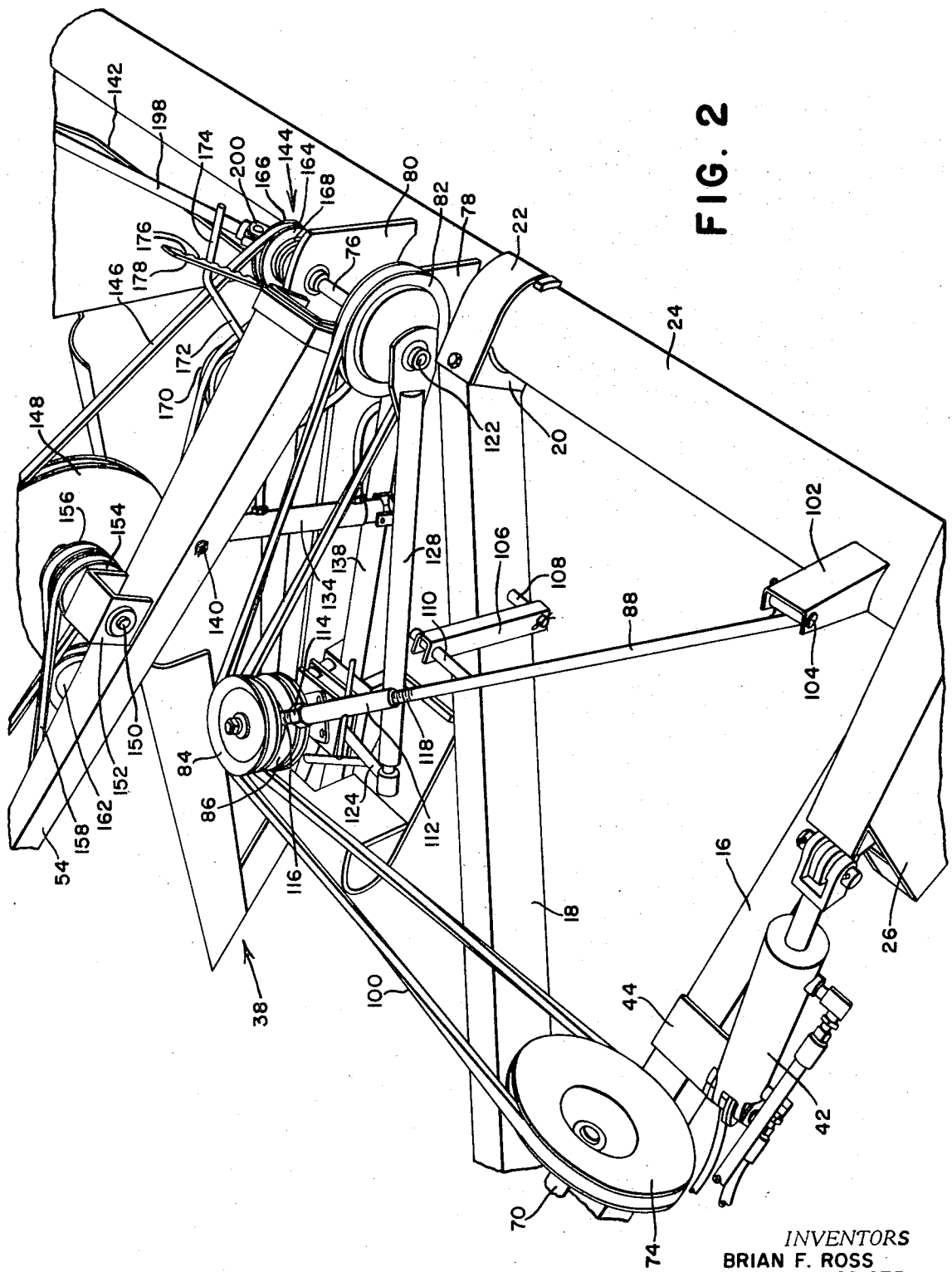
FIG. 2 is an enlarged partial perspective view of the 90° belt drive.

The drive means of the present invention serves to transmit power from the power take-off shaft of the tractor to the power operated components of the windrower, and includes a fore- and-aft shaft 70 substantially enclosed by a U-shaped shield 72 and supported in a conventional manner on the draft frame 10. The shaft 70 is adapted at its forward end for connection to the tractor power take-off shaft, and has a sheave 74 fixed to its rearward end for rotation in a generally vertical, transverse plane. A first transverse countershaft 76 is rotatably mounted on a pair of spaced brackets 78 and 80 upstanding from the tubular main frame member 74, just to the left of the platform 38. A sheave 82 is fixed to the left end of the shaft 76 for rotation therewith in a vertical, fore- and-aft plane, the sheave 82 being drivingly connected with the sheave 74 on the fore- and-aft shaft 70 by means of a 90° belt drive mechanism illustrated best in FIG. 2. As shown therein, the mechanism comprises a pair of upper and lower idler sheaves 84 and 86, respectively, supported on the forward end of a support 88 in substantially transverse and fore- and-aft alignment, respectively, with the driving sheave 74 on the fore- and-aft shaft 70 and the driven sheave 82 on the countershaft 76, and a V-belt 100 drivingly trained around the sheaves. The support 88 is mounted on the frame sections 10 and 14 to compensate for movement of the countershaft sheave 82 relative to the sheave 74 during vertical adjustment of the platform 38. As the main frame 14 is rotated relative to the draft frame 10, the countershaft 76 will travel through an arc concentric with the tubular member 24, resulting in fore- and-aft movement of the driven sheave 82 relative to the driving sheave 74. The idler sheaves 84 and 86 are maintained at a constant distance from the driven sheave 82 through a four-bar linkage consisting of the support 88, an upstanding bracket 102 on the left end portion of the tubular member 24 pivotally receiving the rearward end of the support 88 on a pin 104, the draft frame 10, and a vertical link 106 pivotally received on a pin 108 on the frame 10 at its lower end, and on a pin 110 fixed to the support 88 at its upper end.

The transverse axis of the shaft 76 substantially coincides with that of the pin 104 mounting the rearward end of the support 88, and the distance from that axis to the axis of the tubular member 24 is substantially the same as the distance between the pins 108 and 110 connected by the link 106. This dimensional relationship serves to maintain a constant distance between the idler sheaves 84 and 86 and the driven sheave 82 for all elevations of the platform. Although the idler sheaves 84 and 86 will move fore and aft relative to the driving sheave 74 during adjustment of the platform, this movement is not sufficient to alter the operation of the mechanism. Since the relationship between the sheaves of the mechanism remains essentially constant, so will the tension in the drive belt 100. The proper operating tension is maintained in the belt 100 by means of a turnbuckle 112 and lock nut 114 engaging oppositely threaded portions 116 and 118, on the support 88.

Figure 3:
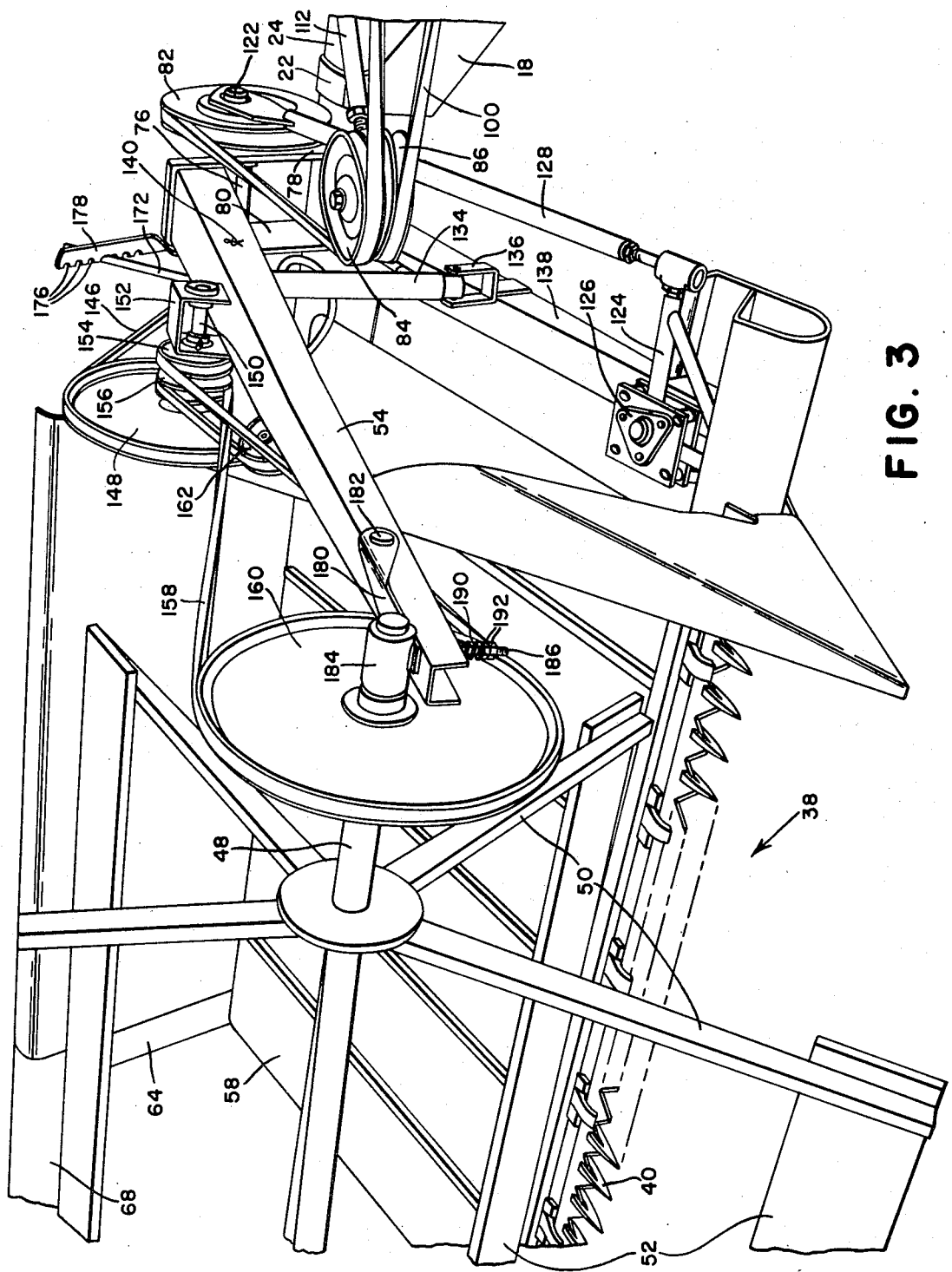
FIG. 3 is an enlarged partial perspective view from the left front of the machine.

The countershaft 76 drives the cutter bar assembly 40 and the reel 46, and additionally drives a second countershaft 120 rotatably received within the tubular member 68 (FIG. 4) which, in turn, drives the canvases 58 and 60. As shown best in FIGS. 2 and 3, the drive mechanism for the cutter bar assembly comprises a crank on the countershaft in the form of a pin 122 eccentrically fixed to the outer side of the sheave 82, a bell crank 124 received for oscillatory motion by a bearing 126 on the left front corner of the platform 38, and a pitman 128 drivingly connecting the pin 122 with the bell crank 124. The forward arm of the bell crank is connected to the left end of the cutter bar (not shown), thereby transmitting the oscillatory motion of the bell crank to reciprocating motion of the cutter bar.

The rearward end of the arm 54 supporting the left end of the reel 48 is pivotally received between the upstanding brackets 78 and 80 on the left tubular member 24, while the arm 56 supporting the right end of the reel is similarly received between a pair of brackets 130 and 132 on the right end of the right tubular member 36. A small one-way hydraulic ram 134 acts between a bracket 136 fixed to an intermediate portion of the platform side member 138 and a pin 140 extending between the side walls of the arm 54, and is extendable in response to fluid under pressure from the hydraulic system of the tractor to swing the arm 54 upwardly about its pivotal connection with the brackets 78 and 80. A similar hydraulic ram (not shown) acts in a like manner between the right end of the platform and the right reel support arm 56. To insure that both arms are raised uniformly, the fluid displaced from the left ram 134 is introduced into a matched input displacement in the right ram through a hydraulic hose 142.

The reel drive mechanism comprises, generally, a variable diameter sheave 144 on the right end of the countershaft 76, a V-belt 146 connecting the sheave 144 with a larger sheave 148 on a countershaft 150 rotatably received by a bracket 152 fixed to the upper surface of the arm 54, and a pair of smaller sheaves 154 and 156 on the countershaft 150 drivingly connected by means of a V-belt 158 with a reel drive sheave 160 on the reel shaft 48. An idler sheave 162, adjustably mounted on the right wall of the arm 54 (not shown), is provided to maintain proper operating tension in the belt 158. The variable diameter sheave 144 consists of left and right sides 164 and 166, respectively, the right side 166 being fixed to the countershaft 76, and the left side 164 being rotatable with the countershaft, though axially movable thereon. The effective diameter of the sheave 144 is determined by the distance between the sides 164 and 166, the diameter being a maximum when the sides abut against each other, and decreasing as they are moved apart. A coil spring 168 constantly urges the left side 164 axially toward the maximum diameter position against the right side 166. The effective diameter of the sheave 144, and thus the speed of the reel 46, is varied by varying the tension in the belt 146. The greater the tension, the further the side 164 is forced away from the side 166, and thus the smaller the effective diameter of the sheave. The tension in the belt 146 is, in turn, varied by means of an idler sheave 170, partially shown in FIGS. 1 and 2. The sheave 170 is rotatably mounted on an adjusting rod 172 which, in turn, is swingably mounted on the right side of the arm 54 (not shown) forwardly of the variable diameter sheave 144. Manual adjustment of the sheave 170 is facilitated by a handle portion 174 comprising the rearward end portion of the rod 172, the handle 174 being selectively engageable with any of a series of notches 176 formed in an upstanding receiving member 178 fixed to the inside wall of the arm 54.

Figure 5:
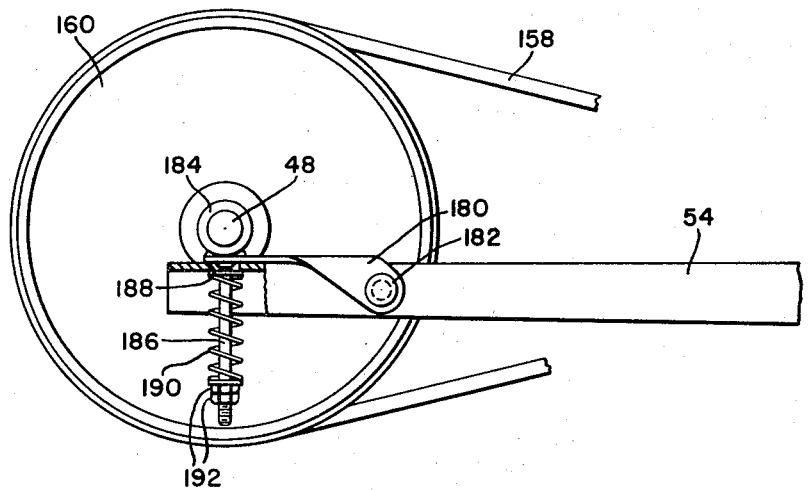
FIG. 5 is a detail of the reel drive spring overload release mechanism, showing the mechanism in its normal operating position.
Figure 6:
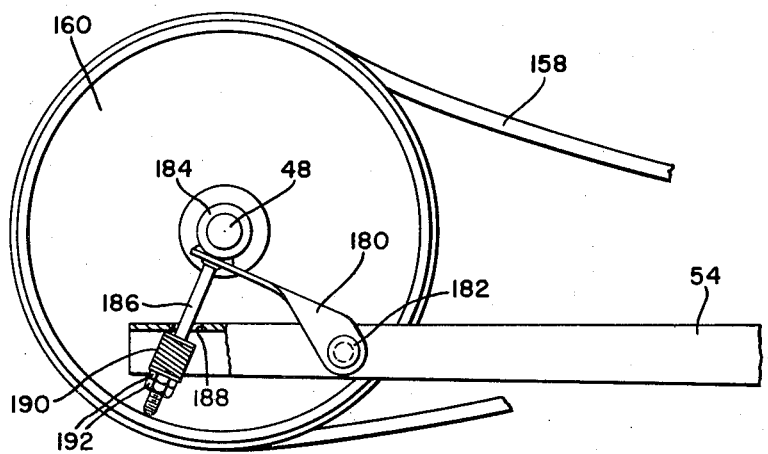
FIG. 6 is a view similar to FIG. 5 showing the mechanism in its tripped position.

A common problem encountered during operation of a conventional windrower is that of damage to the harvester reel due to the presence of rocks and other foreign objects in the field which occasionally obstruct rotation of the reel. Due to its conventional light weight construction, which is desirable from an operational standpoint, the reel is particularly susceptible to such damage. This problem is alleviated, according to the present invention, by the provision of a spring overload release mechanism in the reel drive, this mechanism being shown best in FIGS. 5 and 6. Although the mechanism illustrated, supporting the left end of the reel shaft 48, is shown on the outer end of the left reel arm 54, an identical mechanism, supporting the right end of the reel shaft 48, is included on the outer end of the right reel arm 56. The mechanism includes, generally, a support 180 pivoted at one end on a pin 182 in the arm 54, a bearing member 184 fixed to the forward end of the support and rotatably receiving the left end of the reel shaft 48, an elongated threaded rod 186 fixed to the bottom surface of the forward end of the support and extending downwardly therefrom through a slotted hole 188 in the upper wall of the arm 54, and a coil spring 190 retained on the rod 186 by a pair of nuts 192 in threaded engagement therewith, the spring 190 biasing the support downwardly against the arm as shown in FIG. 5. The operation of the mechanism is as follows. An obstruction preventing rotation of the reel results in abnormally high tension in the V-belt 158 driving the reel sheave 160, which, in turn, results in a greater than normal force tending to move the sheave 160, and thus the reel shaft 48, rearwardly. This rearward force is sufficient to overcome the biasing force of the spring 190, and the support 180 is thus pivoted upwardly and rearwardly about the pivot pin 182 to the position sown in FIG. 6. Since in this latter position the distance between the reel sheave 160 and the sheaves 154 and 156 on the countershaft 150 is less than normal the tension in the belt and thus the force tending to turn the reel sheave 160 is substantially reduced, thereby preventing damage to the reel.

As previously noted, the countershaft 76, in addition to driving the cutter bar 40 and the reel 46, also drives a second countershaft 120 disposed above the swath opening 62 in the outer portion of the main frame 14, which countershaft, in turn, drives the platform canvases 58 and 60. As shown in detail in FIG. 4, the countershaft 120 is supported at opposite ends in bearings 194 and 196 on the outer walls of the respective vertical tubular members 64 and 66 defining the sides of the swath opening 62, and the countershaft is enclosed by the upper transverse tubular member 68 connecting the upper edge of the members 64 and 66 and defining the top of the swath opening 62. An inclined transverse shaft 198 connects the right end of the first countershaft 76 and the left end of the second countershaft 120 through universal couplings 200 and 202, respectively, on opposite ends of the shaft 198.

Figure 4:
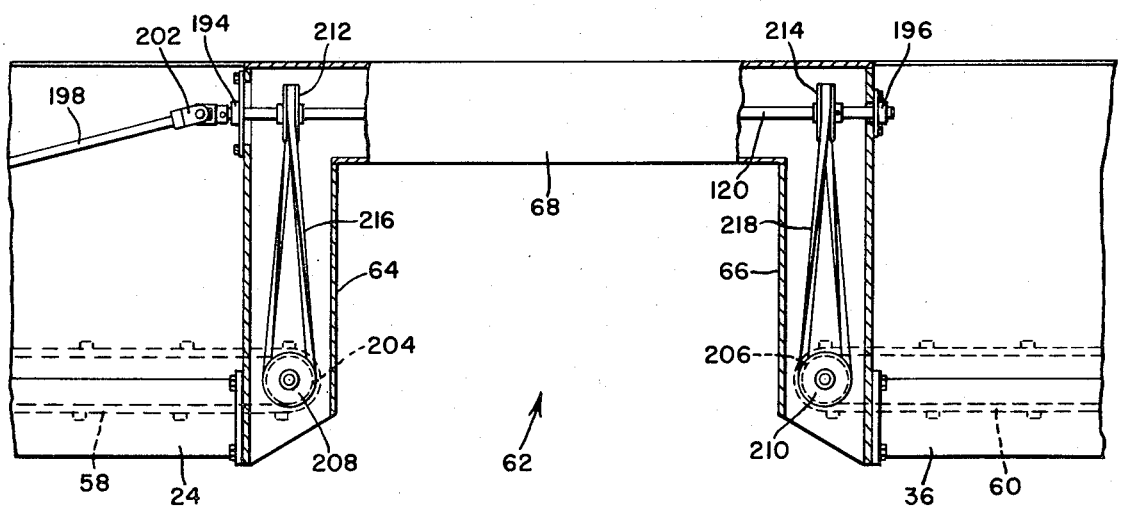
FIG. 4 is a partial rear elevation with portions broken away to more clearly illustrate a feature of the invention.

The right and left canvases 58 and 60 are supported, respectively, on a pair of left and right idler rollers (not shown) extending fore- and-aft on the respective outer sides of the platform between the frame 14 and the cutter bar assembly 40, and a pair of left and right driving rollers 204 and 206, respectively, extending fore- and-aft between the frame 14 and assembly 40 just inwardly of the left and right sides, respectively, of the swath opening 62. The rearward ends of the driving rollers 204 and 206, as shown in FIG. 4, are journaled in the lower forward walls of the vertical members 64 and 66, respectively, and are provided with drive sheaves 208 and 210, respectively. The sheaves 208 and 210 are fixed to the ends of the respective rollers for rotation therewith in a substantially vertical, transverse plane, directly below the countershaft 120. A pair of drive sheaves 212 and 214, fixed on opposite ends of the countershaft 120 for rotation in vertical, fore- and-aft planes are connected, respectively, by V-belts 216 and 218 with the respective roller drive sheaves 208 and 210, to complete the canvas drive system. As shown in FIG. 4, the V-belts 216 and 218 are twisted 90° in opposite directions to drive the corresponding canvases in opposite directions.

We claim:

1. In a windrower having a fore- and-aft frame section adapted at its forward end for connection to a draft vehicle; a transverse frame section connected at one end to the rear portion of said fore- and-aft frame section for pivotal movement about a first transverse axis; a harvesting platform extending forwardly from said transverse frame section and having power-operated means thereon, the combination therewith of drive means for transmitting power to said power-operated means, said drive means comprising: a fore- and-aft shaft rotatably supported on said fore- and-aft frame section, said shaft being adapted at its forward end for driving connection with a power source on the draft vehicle; a transverse countershaft supported on said transverse frame section for rotation about a second transverse axis parallel to and spaced from said first transverse axis; means drivingly connecting said transverse counter shaft with said power-operated means on said platform; a drive sheave on said fore- and-aft shaft; a driven sheave on said transverse countershaft; idler sheave means normally disposed in transverse and fore- and-aft alignment, respectively, with said drive and driven sheaves; endless flexible means drivingly connecting said idler sheave means and said drive and driven sheaves; a fore- and-aft extending support, said idler sheave means being rotatably mounted on the forward end of said support; means mounting the rearward end of said support on said transverse frame section for pivotal movement about said second transverse axis; and a link pivotally connected at opposite ends to said support and said fore- and-aft frame section, respectively.

2. The invention defined in claim 1 wherein the distance between the ends of said link is substantially equal to the distance between said first and second transverse axes.

3. The invention defined in claim 1 wherein said idler sheave means is adjustably mounted on said support.

4. The invention defined in claim 3 wherein said idler sheave means is adjustably mounted on said support for movement along a line bisecting the 90° angle formed by the transverse and longitudinal lines passing through said drive and driven sheaves, respectively.

5. A crop harvesting machine having a transversely extending forward harvesting platform; cutting means extending along the forward edge of said platform; a pair of arms pivotally mounted on the machine and extending forwardly on opposite sides of said platform; a transversely extending reel having a shaft rotatably supported on the forward ends of said arms above said cutting means; a driven sheave on one end of said shaft; a drive sheave on the machine in fore- and-aft alignment with said driven sheave; and endless flexible drive means connecting said drive and driven sheaves, wherein the improvement comprises: a support pivotally mounted on one of said arms; means rotatably mounting said reel shaft on said support; stop means on said arm; and means normally biasing said support against said stop means, said biasing means permitting movement of said support away from said stop means in response to abnormally high tension in said endless flexible drive means.

6. A crop harvesting machine having a transversely extending forward harvesting platform; cutting means extending along the forward edge of said platform; a pair of arms pivotally mounted on the machine and extending forwardly on opposite sides of said platform; a transversely extending reel having a shaft rotatably supported on the forward ends of said arms above said cutting means; a driven sheave on one end of said shaft; a drive sheave on the machine in fore- and-aft alignment with said driven sheave; an endless flexible drive means connecting said drive and driven sheaves, wherein the improvement comprises: a support having first and second ends; means pivotally mounting said first end on one of said arms; means rotatably mounting said reel shaft on said second end; and means normally biasing said second end downwardly against said arm at a point forwardly of said first end, said biasing means permitting movement of said second end way from said arm in response to abnormally high tension in said endless flexible drive means.

7. The invention defined in claim 6 wherein said means biasing said second end of said support downwardly against said arm comprises a rod fixed to the second end of said support and extending through an aperture in said arm; a retainer member on the outer end of said rod; and a coil spring received on said rod and acting between said retainer member and said arm.

8. The invention defined in claim 7 wherein said retainer member is adjustably positioned on said rod to regulate the biasing force of said spring.

9. In a crop harvesting machine having a fore-and-aft frame section adapted at its forward end for connection to a draft vehicle; a transverse frame section connected at one end to the rear portion of said fore- and-aft frame section for pivotal movement about a first transverse axis; a harvesting platform connected to and extending forwardly from said transverse frame section, said platform being moveable vertically in response to rotation of said transverse frame section about said first transverse axis, and power-operated means on said harvesting platform, the combination therewith of drive means for transmitting power from a power source on the draft vehicle to said power-operated means, said drive means comprising: a fore- and-aft shaft rotatably supported on said fore- and-aft frame section and adapted at its forward end for driving connection with a power source on the draft vehicle; a drive sheave on said fore- and-aft shaft; a driven sheave supported on said transverse frame section for rotation about a second transverse axis parallel to and spaced from said first transverse axis, said driven sheave being moveable fore and aft relative to said drive sheave in response to rotation of said transverse frame section about said first transverse axis; means drivingly connecting said driven sheave with said power-operated means on said platform; idler sheave means normally disposed in transverse and fore- and-aft alignment with said drive and driven sheaves, respectively; endless flexible means drivingly connecting said idler sheave means and said drive and driven sheaves; and means mounting said idler sheave means on said transverse frame section, said mounting means being operative to maintain a substantially constant fore- and-aft distance between said idler sheave means and said driven sheave as said transverse frame section is rotated about said first transverse axis.

10. The invention defined in claim 9 wherein said means mounting said idler sheave means on said transverse frame section comprises: a fore- and-aft extending support mounted at one end on said transverse frame section for movement about said second transverse axis and having said idler sheave means rotatably supported at its outer end, and link means pivotally connected at opposite ends to said support and said fore- and-aft frame section, respectively.

11. The invention defined in claim 10 wherein the distance between the ends of said link is substantially equal to the distance between said first and second transverse axes.

12. The invention defined in claim 10 further including a pair of fore- and-aft extending reel support arms mounted on said transverse frame section for pivotal movement about said second transverse axis; a harvesting reel extending transversely above said cutting means and including a shaft rotatably supported on the outer ends of said reel support arms; a reel drive sheave on one end of said reel shaft; and means including endless flexible drive means drivingly connecting said driven sheave with said reel drive sheave.

* * * * *